United States Patent
Kim et al.

(10) Patent No.: US 9,470,928 B2
(45) Date of Patent: Oct. 18, 2016

(54) HOMEOTROPIC ALIGNMENT LIQUID CRYSTAL FILM WITHOUT ALIGNMENT LAYER AND METHOD FOR PREPARING THE SAME

(75) Inventors: Eun-kyung Kim, Daejeon (KR); Dae-hee Lee, Daejeon (KR); Moon-soo Park, Daejeon (KR); Seung-hun Chae, Daejeon (KR); Sin-young Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 1661 days.

(21) Appl. No.: 11/296,699

(22) Filed: Dec. 8, 2005

(65) Prior Publication Data

US 2006/0127603 A1 Jun. 15, 2006

(30) Foreign Application Priority Data

Dec. 11, 2004 (KR) ........................ 10-2004-0104589

(51) Int. Cl.
*B05D 5/06* (2006.01)
*G02F 1/1337* (2006.01)
*C09K 19/30* (2006.01)
*C09K 19/54* (2006.01)
*C09K 19/56* (2006.01)
(Continued)

(52) U.S. Cl.
CPC ..... *G02F 1/133703* (2013.01); *C09K 19/3098* (2013.01); *C09K 19/54* (2013.01); *C09K 19/56* (2013.01); *C09K 2019/0448* (2013.01); *C09K 2019/528* (2013.01); *Y10T 428/10* (2015.01)

(58) Field of Classification Search
CPC ........ G02B 1/105; G02B 5/201; G02B 1/10; G11B 7/26; C03C 2217/425; G02F 1/133703; C09K 19/3098; C09K 19/56; C09K 19/54; C09K 2019/0448; C09K 2019/528; Y10T 428/10

See application file for complete search history.

(56) References Cited

U.S. PATENT DOCUMENTS 3,843,230 A * 10/1974 Haas ................. G02F 1/133703
349/130
4,098,931 A * 7/1978 Yoshida et al. ............... 427/324
5,059,659 A * 10/1991 Gregor et al. ............. 525/329.1
(Continued)

FOREIGN PATENT DOCUMENTS

GB 2 324 382 A 10/1998
GB 2 358 481 A 7/2001
(Continued)

*Primary Examiner* — Michael Wieczorek
*Assistant Examiner* — Michael G Miller
(74) *Attorney, Agent, or Firm* — Dentons US LLP

(57) ABSTRACT

Disclosed is a homeotropic alignment liquid crystal film without an alignment layer and a method for preparing the same. More specifically, the present invention relates to a homeotropic alignment liquid crystal film without using a separate alignment layer to induce a homeotropic alignment of the liquid crystal in which a liquid crystal layer has a homeotropic alignment property by coating a polymerizable and reactive liquid crystalline mixture solution including a predetermined surfactant on a plastic substrate whose surface are hydrophilic-treated, and drying and UV irradiating the mixture solution; a method for preparing the same. The homeotropic alignment liquid crystal film prepared according to the present invention may be very useful as a major component of a viewing-angle compensation film and a retardation film, etc. in LCD, and has advantages of simplicity of the manufacturing process, its shortened manufacturing time, its mass production, etc.

6 Claims, 7 Drawing Sheets

(51) Int. Cl.
*C09K 19/04* (2006.01)
*C09K 19/52* (2006.01)

(56) References Cited

U.S. PATENT DOCUMENTS 5,479,278 A * 12/1995 Takeuchi et al. ............. 349/187
5,688,436 A * 11/1997 Ohnishi et al. ........... 252/299.01
6,816,218 B1 * 11/2004 Coates .............. G02F 1/133719
　　　　　　　　　　　　　　　　　　252/299.01
2002/0054960 A1    5/2002 Yoon
2003/0012935 A1 *  1/2003 Kuntz et al. .................. 428/209
2004/0151911 A1 *  8/2004 Callegari ............ C23C 14/0605
　　　　　　　　　　　　　　　　　　428/408

FOREIGN PATENT DOCUMENTS

KR     2002-0045547          6/2002
TW         499574            8/2002
WO    WO 2005015298 A1 *   2/2005  ........... G02F 1/1337

* cited by examiner

HOMEOTROPIC ALIGNMENT LIQUID CRYSTAL FILM WITHOUT ALIGNMENT LAYER AND METHOD FOR PREPARING THE SAME

This application claims the benefit of Korean Patent Application No. 10-2004-0104589, filed on Dec. 11, 2004, which is hereby incorporated by reference for all purposes as if fully set forth herein.

TECHNICAL FIELD

The present invention relates to a homeotropic alignment liquid crystal film without an alignment layer and a method for preparing the same, and more specifically to a homeotropic alignment liquid crystal film without using a separate alignment layer to induce a homeotropic alignment of the liquid crystal in which a liquid crystal layer has a homeotropic alignment property by coating a polymerizable and reactive liquid crystalline mixture solution including a predetermined surfactant on a plastic substrate whose surface are hydrophilic-treated, and drying and UV irradiating the mixture solution; a method for preparing the same.

BACKGROUND ART

In general, kinds of liquid crystals are divided into a rod-type liquid crystal a coin-type discotic liquid crystal according to their shapes, and a material having at least 2 different indexes of 3-D refractive indexes $n_x$, $n_y$ and $n_z$ is referred to as a birefringence material, and a direction showing no phase-difference generation of the light linearly polarized in an incident direction is defined as an optic axis, ad therefore a long-axis direction of a molecule becomes an optic axis in the rod-type liquid crystal, and a short-axis direction of a molecule becomes an optic axis in the discotic liquid crystal.

Among theses, the rod-type liquid crystal may be divided into five kinds of the alignment, as follows.

Firstly, a planar alignment means an alignment in which an optic axis is parallel to a plane of the film, secondly, a homeotropic alignment means an alignment in which an optic axis is vertical to a plane of the film, namely parallel to a normal of the film, and thirdly, a tilted alignment means an alignment in which an optic axis is declined at a certain angle between 0 to 90° to a plane of the film.

And fourthly, a splay alignment means an alignment in which an optic axis is continuously varied from 0° to 90°, or from the minimum value to the maximum value in the range of 0° to 90°, and fifthly, a cholesteric alignment means an alignment in which an optic axis rotates at a constant angle in a clockwise or a counterclockwise direction when it is viewed in a vertical direction to its plane as it proceeds toward a longitudinal direction while the optic axis is parallel to a plane of the film.

In the second homeotropic alignment amongst theses, a vertical alignment layer may be used for optical films such as a retardation film, a viewing-angle compensation film, etc. in liquid crystal display (LCD) devices such as a TN (Twist Nematic) mode, an STN (Super Twist Nematic) mode, an IPS (In Plane Switching) mode, a VA (Vertical Alignment) mode, an OCB (optically Compensated Birefringence) mode, etc. by using the vertical alignment layer alone or in combination with other film, and was prepared by coating a conventional alignment material to form a thin alignment layer, followed by coating a liquid crystal.

A glass has been mainly used for a substrate used to obtain such a vertical alignment layer, and alignment materials used on the glass substrate are mainly divided into organic alignment materials and inorganic alignment materials according to their kinds.

An example of the organic alignment materials includes lecitin, trichlorosilane and trimethoxypropyl silane, hexadecyl trimethyl ammonium halides, alkyl carboxylato monochromium salts, etc., and a representative example of the inorganic alignment materials includes $SiO_2$ or $MgF_2$, etc.

As a method for preparing a vertical alignment layer using the inorganic alignment material, a method for depositing $SiO_2$ or $MgF_2$ on a surface of a glass substrate has been known.

A principle of forming such a vertical alignment layer is described in brief as an example, as follows. If a small amount (generally, less than 1%) of the said organic alignment material is dissolved in a volatile solvent, coated on a substrate, and then the solvent is evaporated, then only a thin-film alignment material layer is present on the substrate, and if a liquid crystal is coated on the layer, then the liquid crystal is vertically aligned because a polar end group of an alignment material is adhered to a surface of glass having polarity, a hydrophobic alkyl chain is arranged in a vertical direction to the surface of glass, and a homeotropic alignment of liquid crystal molecules is attained by an attraction between the alkyl chain and the liquid crystal molecules.

Because the process of forming such an alignment layer was carried out by a washing process of the glass substrate, a printing process of the alignment layer, and drying and baking process in a sequential order, and electro-optical characteristics of a liquid crystal cell mainly depend on formation of the alignment layer and its surface treatment, it is important to form an alignment layer having a uniform thickness of an entire substrate in the printing process of the alignment layer, and very important to conduct a uniform surface treatment in the rubbing process.

That is to say, the characteristics of the alignment layer formed to arrange liquid crystal molecules in a uniform direction are generally desired to form a uniform thin film having a thickness of less than 1,000° C. at 200° C. or less and has an excellent adhesion property to a surface of the substrate, while a high chemical stability should be high so that it can not react with a liquid crystal, no charge trap should be present in an electrical property, and specific resistance should be sufficiently high so that it can affect no operation of the liquid crystal cell.

If it is possible to obtain a homeotropic alignment liquid crystal film having a homeotropic alignment property although a liquid crystal layer is directly coated on the substrate without coating an alignment layer, then the various and troublesome characteristics required for the alignment layer, as described above, and therefore many limited conditions in the manufacturing process may be never considered, and therefore merits such as simplicity and shortened manufacturing time of the process, and increased yield, etc. may be attained.

Korean Patent Application Publication No. 2002-0045547 disclosed a homeotropic alignment liquid crystal layer without such an additional alignment layer, wherein the used liquid crystal is a liquid crystalline polymer having a monomer unit including a liquid crystalline fragment side chain, and a monomer unit including a non-liquid crystalline fragment side chain. Such a liquid crystal polymer has a disadvantage that it is coated at a liquid state, and dried to remove a solvent, and then a high-temperature heat treatment process in a range of 70 to 200° C. is additionally required due to its higher glass transition temperature Tg than that of a reactive liquid crystal monomer, and it is impossible to apply to a rapid continuous process due to its extended time of 20 seconds to 30 minutes.

Meanwhile, if a glass substrate is used for manufacturing such a homeotropic alignment liquid crystal layer, then it is useful to homeotropically align a liquid crystal in LCD cells composed of glass, but the glass substrate is not suitable to obtain a homeotropic alignment liquid crystal layer so that it can adhere to a polarizing plate for the purpose of improvement of brightness, or viewing-angle compensation, etc.

That is to say, if a homeotropic alignment liquid crystal film is made of a glass substrate, then a roll-to-roll process, pressured while passing between rollers that face each other with a constant distance, should be carried out as described in the process of preparing the polarizing plate so as to adhere to a polarizing plate for the purpose of improvement of brightness, or viewing-angle compensation, etc., but it is nearly impossible to control the process so that the glass substrate can rapidly pass between the rollers without any damage to the glass substrate, and therefore it is difficult to mass-produce it due to such a problem.

In order to solve the problems, it may be desirable to use a plastic substrate having flexibility to pressure and slight impact other than a glass substrate as the substrate.

However, a plastic substrate may not be used as the aforementioned alignment material to obtain a vertical alignment layer since its surface does not have polarity as high as the glass surface.

Accordingly, some methods have been proposed so as to solve the problem shown if the plastic substrate is used instead of the glass substrate.

GB2324382A discloses a method wherein a material, in which a surfactant is fixed by a polymerizable liquid crystal material or a polymerizable high molecule on a plastic substrate, is used for an alignment layer.

Also, GB2358481A discloses a method wherein an aluminum film deposited on a plastic substrate is used for a vertical alignment layer.

However, both patent publications disclose a method wherein an alignment layer is firstly coated on a plastic substrate, and then a liquid crystal layer is coated, and if the deposited aluminum layer is particularly used as the alignment layer, then aluminum may be caused by defects of the plastic substrate since the aluminum adheres to its surface, and then some of the aluminum is removed off upon its peeling.

Accordingly, if a homeotropic alignment liquid crystal film may be prepared by directly coating a liquid crystal layer on a plastic substrate without coating an alignment layer, then it has excellent effects that it shows the simplicity of the process and the shortened processing time due to the omitted step of forming an alignment layer, as well as it may be mass-produced since the roll-to-roll process, which may not be obtained if a glass substrate is used, is possible, as described above.

DISCLOSURE OF INVENTION

Technical Problem

Therefore, the present invention is designed to solve the problems of the prior art, and it is an object of the present invention to provide an a homeotropic alignment liquid crystal film wherein a homeotropically aligned liquid crystal film is formed without using a separate alignment layer by directly coating a polymerizable and reactive liquid crystalline mixture solution comprising a surfactant on a plastic substrate whose surface are hydrophilic-treated.

And, it is an object of the present invention to provide a polarizer film where the polarizing plate is coupled with the homeotropic alignment liquid crystal film; and a liquid crystal display device using the polarizer film.

Technical Solution

In order to accomplish the objects, the present invention provides a method for preparing a homeotropic alignment liquid crystal film without any of a separate alignment layer by directly coating a polymerizable and reactive liquid crystalline mixture solution comprising a surfactant on a plastic substrate whose surface are hydrophilic-treated, and drying and UV irradiating the mixture solution to form a liquid crystal layer having a homeotropic alignment property; a method for preparing the same.

Preferably, the surfactant mixed to the polymerizable and reactive liquid crystalline mixture solution is added in an amount of 0.3 to 3.0% by weight, based on the total weight of the solid in which at least one of the fluorocarbon-based or silicone-based surfactants is included in the reactive liquid crystal mixture solution.

And in the case of the plastic substrate capable of applying to the roll-to-roll process, a corona discharge treatment or an alkaline treatment may be preferably carried out as the hydrophilic treatment so that its surface can be hydrophilic, and a cellulose derivative film may be particularly preferably used as the plastic substrate having a good hydrophilic property after the alkaline treatment.

Also, the present invention provides a homeotropic alignment liquid crystal film prepared by the method as described above, a polarizer film including the homeotropic alignment liquid crystal film, and a liquid crystal display device including the polarizer film.

Advantageous Effects

According to the present invention, a homeotropic alignment liquid crystal film may be prepared, wherein the homeotropic alignment liquid crystal film has a homeotropic alignment property without forming an additional alignment layer on a plastic substrate undergoing a hydrophilic treatment, and therefore the present invention has excellent effects such as reduction of the cost due to the process simplicity, and therefore a shortened time of the process and reduction of poor products since the step of forming an additional alignment layer may be omitted in the process of the present invention.

And, the present invention has an excellent effect of mass production of a homeotropic alignment liquid crystal film by applying a roll to roll process required for the mass production since an additional plastic substrate undergoing the hydrophilic treatment, a protective film of a polarizing plate, or other retardation film included in the polarizer film may be used as a substrate to prepare a homeotropic alignment liquid crystal film.

Also, the polarizer film, included in the homeotropic alignment liquid crystal film and the homeotropic alignment liquid crystal film prepared according to the present invention, has an advantageous effect capable of being very useful as a major component of the viewing-angle compensation film and the retardation film, etc. in various LCD modes.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Figure 1:
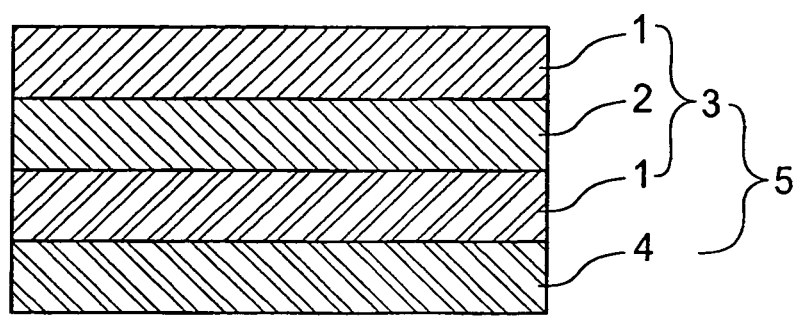
FIG. 1 is a vertical cross-sectional view showing a configuration of a polarizer film to which a homeotropic alignment liquid crystal film prepared according to the present invention is coupled using a protective film of a polarizing plate as a substrate.

Hereinafter, preferred embodiments of the present invention will be described in detail with reference to the accompanying drawings.

At first, two requirements, which should be satisfied in conventional homeotropic alignment techniques, will be described prior to description of the present invention.

The first requirement is that a hydrophobic group, an alkyl chain, of an alignment material should be aligned vertically to a substrate so that a liquid crystal can be aligned vertically to a substrate, and simultaneously should attract liquid crystal molecules, and an end portion connected to an alkyl chain should have a hydrophilic group that shows an opposite polarity to the alkyl chain, and also adhere to a surface of a substrate for this purpose.

And, the second requirement is that a surface of a substrate should be made of materials having a high polarity enough that the hydrophilic group, as described in the first requirement, can adhere to the surface.

The present inventors found that, in addition to materials having the hydrophobic alkyl chains and the hydrophilic end groups known as a homeotropic alignment material in the art, surfactants, developed and commercially widely used in order to reduce a surface tension of a coating solution to improve a coating property, or to improve a slipping property, satisfy the two requirements, which should be satisfied in the homeotropic alignment technique as described above.

It was revealed that hydrophilic end groups of a surfactant may be moved and fixed to a hydrophilic substrate surface if a polymerizable and reactive liquid crystalline mixture solution including the surfactant was prepared by mixing the surfactant in a solution including a reactive liquid crystal monomer, a photoinitiator and a solvent, followed by coating the solution on a glass substrate known as the representative hydrophilic substrate, and it was also seen that an additional process of preparing an alignment layer may be omitted if a polymerizable and reactive liquid crystalline mixture solution including the surfactant is used, by observing through naked eyes or a polarizing microscope that a thin film, a liquid crystal layer obtained through the coating, drying and UV irradiating processes, has a homeotropic alignment property.

However, if a homeotropic alignment liquid crystal film is formed on a glass substrate, then it is unnecessary to apply a polymerizable and reactive liquid crystalline mixture solution including the surfactant into a plastic substrate because it is impossible to apply to a roll-to-roll process which should be undergone during the process of manufacturing a polarizing plate.

In order to coat a polymerizable and reactive liquid crystalline mixture solution including the surfactant prepared by the present invention on a plastic substrate to form a homeotropic alignment liquid crystal layer, a hydrophilic treatment should be carried out so that end groups presenting hydrophilic groups of the surfactant can be fixed on a surface of the plastic substrate. Also, the polymerizable and reactive liquid crystalline mixture solution including the surfactant does not form a homeotropic alignment liquid crystal layer contrary to the glass substrate if it is coated on the substrate since an untreated plastic substrate does not have hydrophilicity as high as the representative hydrophilic material, a glass substrate.

Accordingly, the present inventors confirmed that a homeotropic alignment liquid crystal layer without any of an additional alignment layer may be obtained since a surface of the plastic substrate presents the hydrophilicity if the surface of the plastic substrate is hydrophilic-treated, especially corona discharge-treated or alkaline-treated so as to enhance the hydrophilicity of the surface of the plastic substrate, and then the polymerizable and reactive liquid crystalline mixture solution including the surfactant is coated on the plastic substrate.

A principle of a corona discharge used for the hydrophilic treatment is as follows. If a high voltage is applied to an electrode with maintaining a constant distance between a substrate and the electrode, the air present between the substrate and the electrode is ionized, and then the ionized air particles changes surface properties of the plastic substrate. At this time, it was known that an alcohol group (OH) or keton group (C=O), etc. having a strong hydrophilicity is generated and therefore a surface energy is more increased than prior to the corona discharge treatment.

The polymerizable and reactive liquid crystalline mixture solution including the surfactant used in the present invention includes surfactants, photoinitiators, reactive liquid crystal monomers and solvents, which, hereinafter, will be described later.

The surfactant used in the present invention includes fluorocarbon-based or silicone-based surfactants. The fluorocarbon-based surfactants includes NOVEC (trade name) FC4430 from the company 3M (U.S.), NOVEC FC4432, and Zonyl manufactured from the company Dupont (U.S.), etc., and the silicone-based surfactant includes BYK (trade name) manufactured from the company BYK-Chemie, etc.

At this time, the surfactant preferably has a content of 0.3 to 3.0% by weight, based on the total mass of the solid included in the entire mixture solution. That is why that if its content is 0.3% by weight or less, then its liquid crystal alignment is poor, while if its content exceeds 3.0% by weight, then its liquid crystal alignment is also poor, as well as its coating property is deteriorated since a spreading property of the solution becomes increased.

Also, the photoinitiators are mainly divided into free-radical photoinitiators and photoinitiators generating ions, depending on kinds of materials which initiate a polymerization reaction. An example of the free-radical photoinitiators includes Irgacure (trade name) 907, Irgacure651, Irgacure184, etc manufactured from the company Ciba-Geigy (Switzerland), and UVI (trade name) 6974, etc. manufactured from the company Union Carbide (U.S.A.) may be used as the positive photopolymerization initiators.

The reactive liquid crystal monomer is polymerized with surrounding liquid crystalline monomer by the light or heat to form a polymer, and its kinds is not limited thereto. At least one group, selected from the group consisting of compounds to which an acrylate group is adhered, may be used as example of the reactive groups which may conduct polymerization reaction of such a reactive liquid crystal monomer.

An example of the reactive liquid crystal monomer includes reactive liquid crystal monomers represented in the following Formulas 1 to 3. They may be used alone or in combination thereof.

solvent, while if its content exceeds 70% by weight, then the liquid crystal may be extracted during its keeping period since the solvent has a relatively low content to the solid, or a wetting property may be deteriorated upon its coating due to its significantly high viscosity.

Kinds of the solvents, which are included in the polymerizable and reactive liquid crystalline mixture solution in combination with the surfactants, the reactive liquid crystal monomers and the photoinitiators as described above, is not particularly limited if it has an excellent solubility with its related liquid crystal mixture and an excellent coating property on the substrate upon its coating, and it does not corrode the substrate.

For example, such a solvent includes, but is not limited to, halogenated hydrocarbons such as chloroform, dichloromethane, tetrachloroethane, trichloroethylene, tetrachloroethylene, chlorobenzene, etc.; aromatic hydrocarbons such as benzene, toluene, zylene, methoxy benzene, 1,2-dimethoxybenzene, etc.; ketones such as acetone, methylethylketone, cyclohexanone, cyclopentanone, etc.; alcohols such as isopropyl alcohol, n-butanol, etc.; cellosolves such as methyl cellosolve, ethyl cellosolve, butyl cellosolve, etc. And, they may be used alone or in combination thereof.

Next, a plastic substrate whose surface is hydrophilic-treated to be suitable for being used in the present invention will be described.

An example of the plastic substrate, capable of homeotropically aligning the polymerizable and reactive liquid crystal mixture solution including the surfactant after the corona discharge treatment, includes films such as triacetyl cellulose, polyethylene terephthalate, polycarbonate, polyethylene, cycloolefin polymers such as norbornene derivatives, etc., polyvinyl alcohol, diacetyl cellulose, polyether sulfone, etc. The plastic substrates are mainly commercially available products, and therefore may be easily available from various manufacturers.

In addition to the corona discharge treatment, a homeotropic alignment liquid crystal layer may be prepared when a certain plastic substrate such as a cellulose derivative film, especially triacetyl cellulose film is alkaline-treated, and then coated with the polymerizable and reactive liquid

[Formula 1]

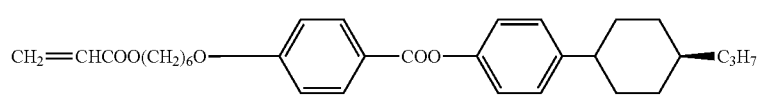

[Formula 2]

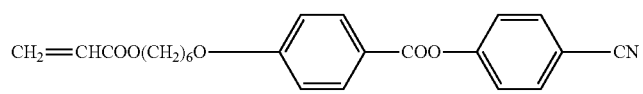

[Formula 3]

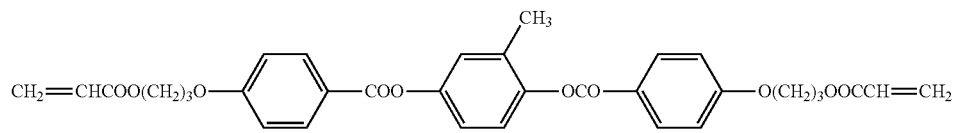

When the liquid crystal monomer is dissolved in a solvent, content of the solid may be varied according to thickness of a desired liquid crystal layer and a coating method, but is not particularly limited thereto. It is preferred to have a content of 5 to 70% by weight, and more preferably 10 to 50% by weight.

With reference, if content of the solid is less than 5% by weight, drying time may be extended, or a surface flow may be increased to form many spots due to a large amount of the crystalline mixture solution including the surfactant according to the present invention. That is why an acetate group of the triacetyl cellulose film is hydrolyzed into an alcohol group in the alkaline solution.

For such a plastic substrate, many products having excellent flexibility and durability may be commercially available, and therefore they have also advantages in the mass-production aspect such as the roll-to-roll production, the high-speed production and so on, compared to the glass substrate.

In the present invention, an aqueous NaOH solution is mainly used as the materials suitable for the alkaline treatment of the plastic substrate, and the treatment process is carried out by dipping a film in an aqueous NaOH solution for several ten seconds to several minutes, washing it with water, and then evaporating moistures in a drying oven.

Hereinafter, a specific manufacturing process, in which a plastic substrate having a coarse surface, which undergoes the hydrophilic treatment such as the corona discharge treatment or the alkaline treatment, etc. as described above, is coated with the polymerizable and reactive liquid crystalline mixture solution including the surfactant according to the present invention to form a homeotropic alignment liquid crystal layer, is as follows.

At first, a method for coating the polymerizable and reactive liquid crystalline mixture solution including the surfactant on a plastic substrate is not particularly limited, but a method capable of being coated at a uniform thickness is preferred, and such a coating method includes a spin coating process, a wire-bar coating process, a microgravure coating process, a gravure coating process, a dip coating process, a spray coating process, etc.

Thickness of the homeotropic alignment liquid crystal film may be varied according to a desired phase difference, that is, $\Delta n$(birefringence index)*d(thickness of liquid crystal layer), but it generally preferably ranges from about 0.1 µm to 10 µm.

A method for removing a solvent from the reactive liquid crystal mixture solution coated on the substrate at a predetermined density using the coating method is not particularly limited if most of the solvent may be removed off, and the coated liquid crystal layer does not run down and flow heavily, and conventional drying method such drying at room temperature, drying in a drying oven, drying on a heating plate by heating, drying using infrared rays, etc. may be used.

A process for curing a homeotropically aligned liquid crystal layer by polymerizing it is required after evaporating a solvent. And, the process for curing a liquid crystal is mainly divided into a curing by the light and a curing by the heat, and a liquid crystal mixture used in the present invention is a photoreactive liquid crystal mixture which is fixed by UV irradiation.

At this time, the polymerization procedure is carried out in the presence of a photoinitiator which absorbs a range of UV wavelengths, and the UV irradiation may be carried out under an atmospheric pressure, or under a nitrogen atmosphere so as to enhance its reaction efficiency by interrupting oxygen.

A medium-pressure or high-pressure UV lamp or a metal halide lamp which has an intensity of illumination of about 100 mW/cm$^2$ or more is generally used as an UV irradiator.

Also, a cold mirror or other cooling apparatuses may be installed between the substrate and the UV lamp so that a surface temperature of a liquid crystal layer can be within the liquid crystalline temperature upon UV irradiation.

There have been various methods for measuring presence of homeotropic alignment and a quantitative phase difference value of the liquid crystal film prepared by the method. The presence of homeotropic alignment of the liquid crystal film may be observed between the vertically crossed polarizing plates by the naked eyes or the polarizing microscope.

That is, when a liquid crystal film is positioned between the vertically crossed polarizing plates and view in an incident direction vertical to a surface of the film, the light is not transmitted, and therefore black colors are observed since the homeotropically aligned liquid crystal layer does not generate a phase difference, but if it is viewed while inclining the incident angle, then a phase difference is generated to transmit the light, and therefore the film is brightly observed.

At this time, a quantitative phase difference value in the direction inclined from the vertical incident angle to a certain angle may be measured using an automatic birefringence-measurement apparatus KOBRA-21ADH (Manufactured by the company Oji Scientific Instruments, Japan).

Finally, for the homeotropic alignment liquid crystal film, prepared according to the aforementioned manufacturing method using the polymerizable and reactive liquid crystalline mixture solution including the surfactant as described above and the hydrophilic-treated plastic substrates, etc., its processing time may be reduced since an additional process for forming an alignment layer is not required, and it may be mass-produced due to applicability to the roll-to-roll process.

Also, the homeotropic alignment liquid crystal film, in which the presence of homeotropic alignment is confirmed by the above method, may be used after it is removed from the substrate using a pressure sensitive adhesive (PSA), and the homeotropic alignment liquid crystal film coated onto the substrate without its peeing may be used by itself. Therefore, the homeotropic alignment liquid crystal film according to the present invention may be very effectively used as a retardation film or a viewing-angle compensation film in the various shapes of the LCD modes such as a TN mode, an STN mode, an IPS mode, a VA mode, an OCB mode, etc. if the homeotropic alignment liquid crystal film is used in the form of a polarizer film adhered to a polarizing plate.

Hereinafter, one embodiment of the present invention, wherein a homeotropic alignment liquid crystal film form on a plastic substrate is adhered to a polarizing plate or a polarizing film for the purpose of improvement of its brightness or compensation of its viewing angle, will be described with reference to the drawings.

Figure 2:
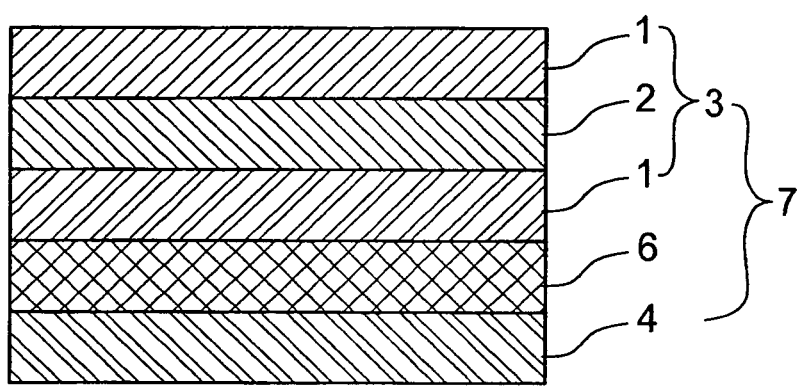
FIG. 2 is a vertical cross-sectional view showing a configuration of a polarizer film prepared by transferring the homeotropic alignment liquid crystal film manufactured on other substrates to a polarizing plate with an adhesive according to the present invention.

FIG. 1 shows a polarizer film 5 wherein a protective film 1 for protecting a polarizer 2 of a polarizing plate 3 is used as a substrate to form a homeotropic alignment liquid crystal film 4 without any of an additional alignment layer using the aforementioned method, and then the homeotropic alignment liquid crystal film 4 is coupled to the polarizing plate 3, and FIG. 2 shows a polarizer film 7 prepared by transferring the homeotropic alignment liquid crystal film 4 formed on other substrate to a polarizing plate 3 using a pressure sensitive adhesive 6.

Figure 3:
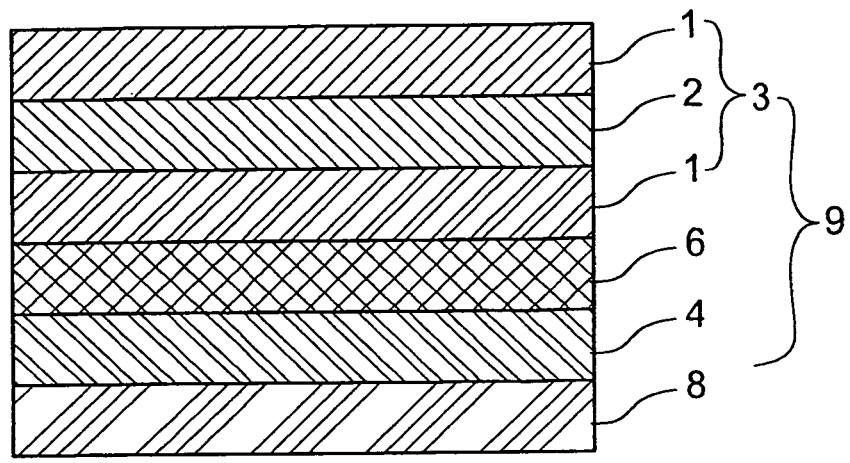
FIG. 3 is a vertical cross-sectional view showing a configuration of a polarizer film prepared by adhering the homeotropic alignment liquid crystal film, prepared by using a retardation film as a substrate, to a polarizing plate with an adhesive according to the present invention.
Figure 4:
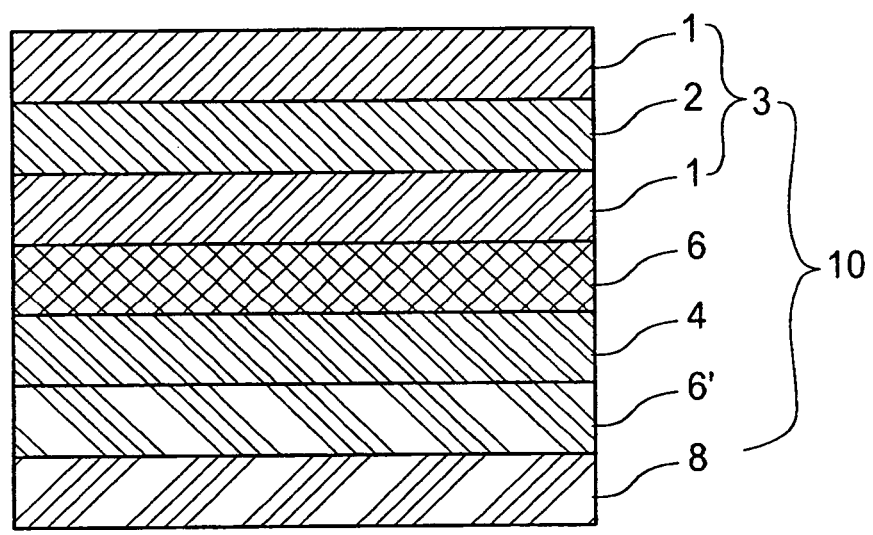
FIG. 4 is a vertical cross-sectional view showing a configuration of a polarizer film prepared by transferring the homeotropic alignment liquid crystal film manufactured on other substrates to a polarizing plate with an adhesive, followed by adhering other retardation film to a surface of the liquid crystal film with an adhesive according to the present invention.

FIGS. 3 and 4 show methods wherein a retardation film (a high-molecular film or a plastic film) is laminated on a homeotropic alignment liquid crystal film to prepare a polarizer film. With reference, the term retardation film has been recently widely used for compensating an optical viewing angle property since a viewing angle property is not generally realized to have symmetricity in a single alignment mode except IPS. FIG. 3 shows a polarizer film 9 prepared by adhering the homeotropic alignment liquid crystal film, prepared by the above method using such a retardation film 8 as the substrate, to a polarizing plate 3 using a pressure sensitive adhesive 6.

FIG. 4 shows a polarizer film 10 prepared by transferring the homeotropic alignment liquid crystal film 4 formed firstly on other substrate to a polarizing plate 3 using a pressure sensitive adhesive 6, followed by adhering other retardation film 8 to a surface of the liquid crystal film using a pressure sensitive adhesive 6'.

Surface energy values of three kinds of plastic substrates before treatment, after corona discharge treatment, and after alkaline treatment, and presence of homeotropic alignment after each substrate is coated with the polymerizable and reactive liquid crystalline mixture solution including the surfactant are listed in the following Table 1.

A surface energy-measurement apparatus is a G2 Contact Angle Meter from the company Kruss (Germany), and an Wu equation is used to calculate a surface energy from the contact angles.

TABLE 1

| Kinds of Film | Conditions | Surface Energy (mN/m) | Homeotropic Alignment or Not |
|---|---|---|---|
| Triacetyl Cellulose | Before treatment | 54.1 | No alignment |
| | After Corona discharge treatment | 60.2 | Alignment |
| | After Alkaline treatment | 78.0 | Alignment |
| Polyethylene terephthalate | Before treatment | 55.3 | No alignment |
| | After Corona discharge treatment | 61.5 | Alignment |
| Norbornene Derivatives | Before treatment | 43.3 | No alignment |
| | After Corona discharge treatment | 63.0 | Alignment |

From the Table 1, triacetyl cellulose is a product from the company Fuji (trade name: 80UZ, Japan), polyethylene terephthalate is a product from the company SKC (trade name: SH34, Korea), and norbornene derivative is a product from the company Zeon (trade name: Zeonor, Japan)

All the three films show the increased surface energy values after the corona discharge treatment, and they are not commonly homeotropically aligned before the treatment, but homeotropically aligned after the corona discharge treatment.

Also, the alkaline-treated triacetyl cellulose is homeotropically aligned after the corona discharge treatment, and it has the increased surface energy values, compared to that of the triacetyl cellulose before the treatment.

MODE FOR INVENTION

Hereinafter, although the present invention will be described with reference to the following embodiments, the present invention is not limited to the following Embodiments.

(Embodiment 1)

A liquid crystal monomer included in a polymerizable and photoreactive liquid crystalline mixture solution used in one embodiment of the present invention is as follows.

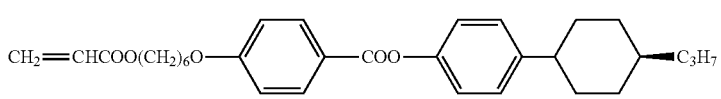
(Formula 1)

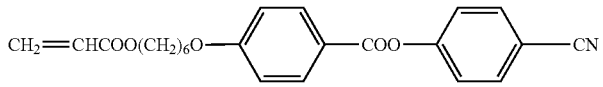
(Formula 2)

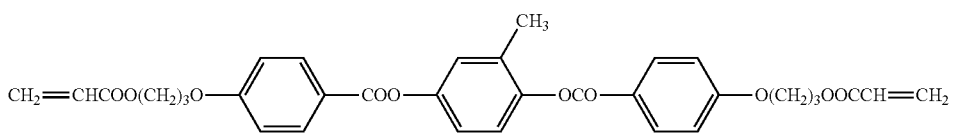
(Formula 3)

A compound of the Formula 1 was prepared according a method as described in GB 2,280,445, a compound of the Formula 2 was prepared according a method as described in D. J. Broer, etc. Makromol. Chem. 190, 3201-3215(1989), and a compound of the Formula 3 was prepared according a method as described in WO 93/22397.

A solid, in which 40% by weight of the compound of the Formula 1, 27% by weight of the compound of the Formula 2, 27% by weight of the compound of the Formula 3, and 6.0% by weight of Irgacure907 (manufactured from the company Ciba-Geigy, Switzerland) were mixed, was dissolved in a mixed solvent including 70% by weight of toluene and 30% by weight of cyclohexanone so that content of the solid can be 25% by weight, to prepare a polymerizable and reactive liquid crystalline mixture solution.

A fluorocarbon-based surfactant Novec (trade name, manufactured from the company 3M, U.S.A.) FC4430 was added to the polymerizable and reactive liquid crystalline mixture solution so that its content can be 1.0% by weight, based on 100% by weight of the solid included in the entire solution.

The triacetyl cellulose film (trade name: 80UZ, manufactured from the company Fuji, Japan) was corona discharge-treated, and then coated with the polymerizable and reactive liquid crystalline mixture solution including the surfactant using a wire-bar coater (No.4), kept at 50° C. in a drying oven for 2 minutes, and then cured once at a rate of 3 m/min using a 80 W/cm high-pressure mercury lamp. The resultant liquid crystal film was clear and its thickness was 1.0 μm.

In order to confirm an optical property of the liquid crystal film, only a liquid crystal film on the triacetyl cellulose film was peeled using the glass substrate coated with a pressure sensitive adhesive, and then the phase difference according to the viewing angles was measured using an automatic birefringence-measurement apparatus KOBRA-21ADH (Manufactured by the company Oji Scientific Instruments, Japan). The result is shown in FIG. 5.

Figure 5:
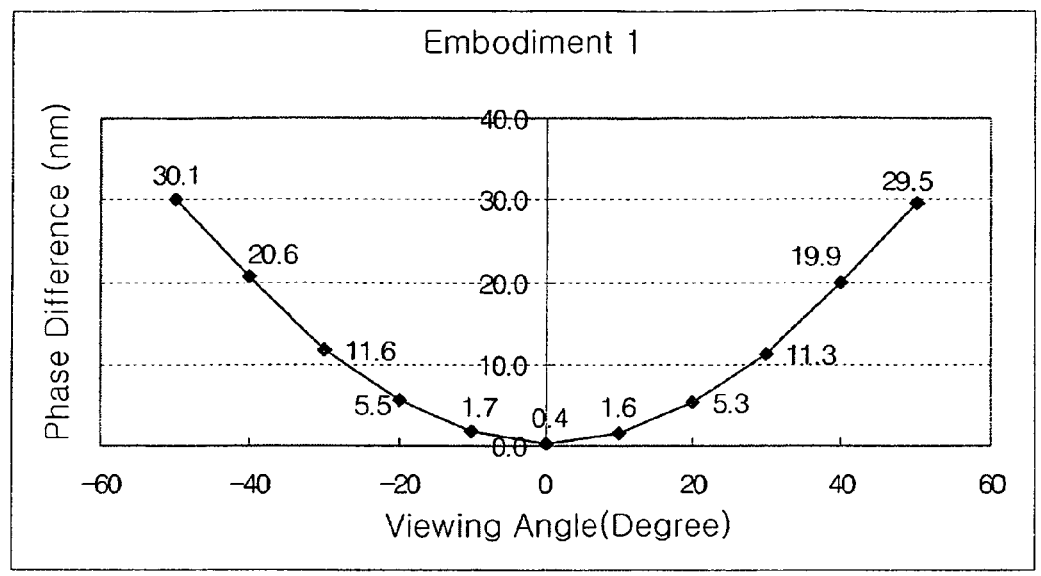
FIG. 5 is a diagram showing a change curve of phase difference values according to viewing angles of a homeotropic alignment liquid crystal film prepared in Embodiment 1.

From FIG. 5, it was seen that the liquid crystal molecules of the liquid crystal film were aligned vertically to the film surface since the phase difference was not present in a vertical direction to the film, the phase difference increased as the viewing angle increased, the values in a − direction and a + direction of the viewing angle were symmetric.

Also, if an in-plane mean refractive index is called "no", an refractive index in a vertical direction is called "ne", and thickness of the liquid crystal film is called "d" from the phase difference values according to the viewing angles, then phase difference (Rth) values in the vertical direction calculated by the following Equation 1 was 106 nm.

$$R_{th}=\Delta n \sim d=(n_e-n_o)\cdot d \qquad \text{[Equation 1]}$$

(wherein, $n_o$ is calculated by $(n_x+n_y)/2$, $n_e$ represents $n_z$)

(Embodiment 2)

A liquid crystal film having a thickness of 1.0 μm was prepared by coating it with the reactive liquid crystal mixture solution and photocuring it in the same manner as in Embodiment 1, except that a polyethylene terephthalate film (trade name: SH34, manufactured from the company SKC, Korea) was corona discharge-treated as a substrate for coating the liquid crystal, and the phase difference of the liquid crystal film was measured in the same manner as in Embodiment 1.

Figure 6:
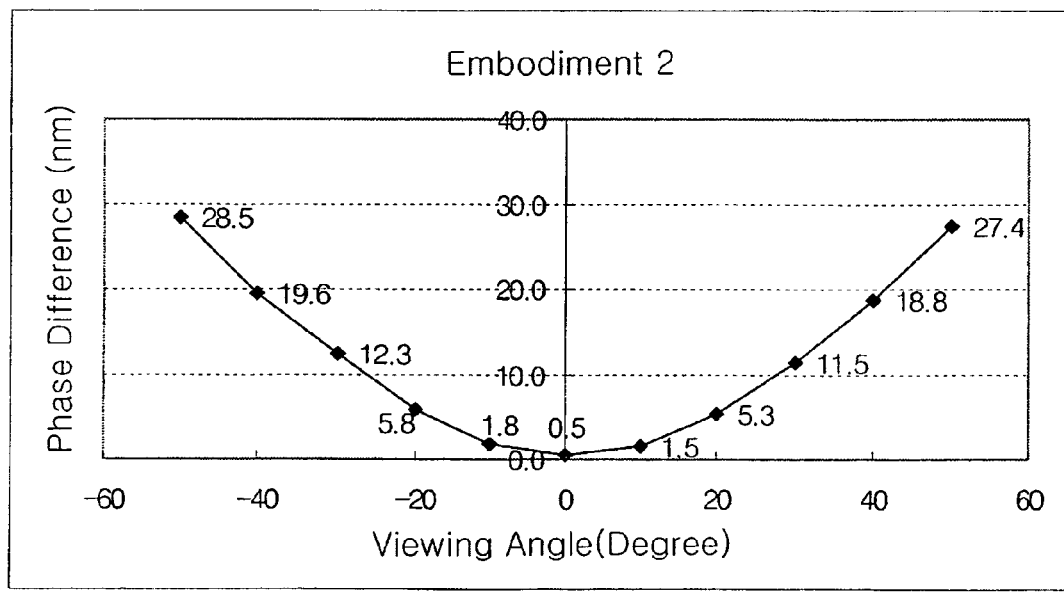
FIG. 6 is a diagram showing a change curve of phase difference values according to viewing angles of a homeotropic alignment liquid crystal film prepared in Embodiment 2.

A change of the phase difference values according to the viewing angle of Embodiment 2 was shown in FIG. 6. From comparison of Embodiment 2 to Embodiment 1, it was seen that the liquid crystal molecules of the liquid crystal film were aligned vertically to the film surface since the phase difference was not present in a vertical direction to the film except the phase difference (Rth) value in the vertical direction is slightly different value of 99.5 nm, the phase difference increased as the viewing angle increased, the values in a – direction and a + direction of the viewing angle were symmetric, as described in Embodiment 1.

(Embodiment 3)

A liquid crystal film having a thickness of 1.0 μm was prepared by coating it with the reactive liquid crystal mixture solution and photocuring it in the same manner as in Embodiment 1, except that a norbornene derivative film Zeonor (trade name, manufactured form the company Zeon, Japan) was corona discharge-treated as a substrate for coating the liquid crystal.

Figure 7:
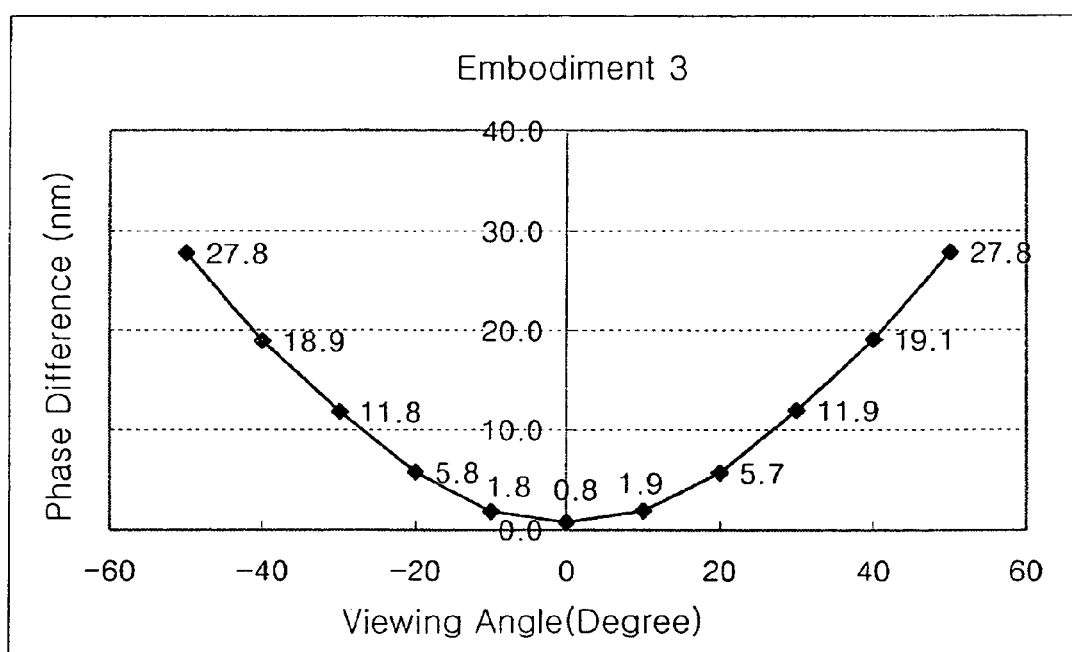
FIG. 7 is a diagram showing a change curve of phase difference values according to viewing angles of a homeotropic alignment liquid crystal film prepared in Embodiment 3.

For Embodiment 3, the phase difference of the liquid crystal film was measured in the same manner as in Embodiment 1, and a change of the phase difference values according to the viewing angles was shown in FIG. 7. And, the phase difference (Rth) value in the vertical direction was 99.0 nm in Embodiment 3.

From Embodiment 3, it was seen that the liquid crystal molecules of the liquid crystal film were also aligned vertically to the film surface since the phase difference was not present in a vertical direction to the film, the phase difference increased as the viewing angle increased, the values in a – direction and a + direction of the viewing angle were symmetric, as described in Embodiments 1 and 2.

(Embodiment 4)

A triacetyl cellulose film (trade name: 80UZ, manufactured from the company Fuji, Japan) was alkaline-treated as a substrate for coating the liquid crystal during hydrophilic treatment, and a process for alkaline-treating a surface of the plastic substrate, a triacetyl cellulose film is as follows.

An aqueous NaOH solution having a solid content of 15% by weight was prepared by dissolving NaOH (manufactured from the company Sigma-Aldrich) in water, and the triacetyl cellulose film was dipped in the aqueous NaOH solution for 2 minutes, washed with water, and then kept at 80° C. in a drying oven for 5 minutes.

A liquid crystal film having a thickness of 1.0 μm was prepared in the same manner as in Embodiment 1, except that the triacetyl cellulose film was used as a substrate for coating the liquid crystal, and the phase difference of the liquid crystal film was measured in the same manner as in Embodiment 1.

Figure 8:
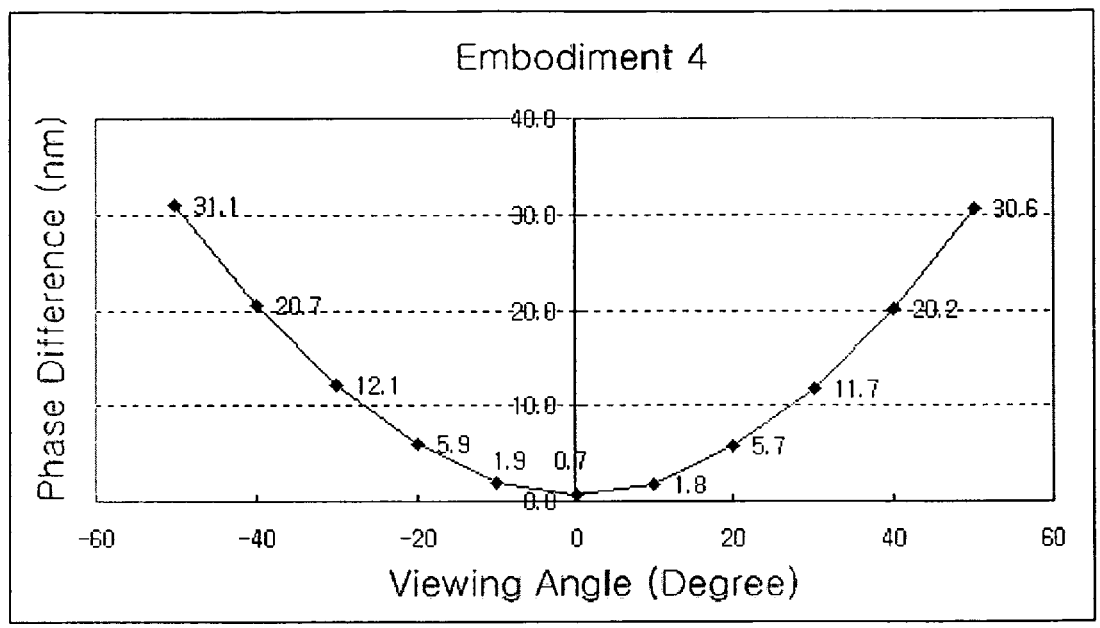
FIG. 8 is a diagram showing a change curve of phase difference values according to viewing angles of a homeotropic alignment liquid crystal film prepared in Embodiment 4.

For Embodiment 4, the phase difference values according to the viewing angles were shown in FIG. 8, and the phase difference (Rth) value in the vertical direction was 110 nm.

From Embodiment 4, it was seen that the liquid crystal molecules of the liquid crystal film were also aligned vertically to the film surface since the phase difference increased as the viewing angle increased, the values in a – direction and a + direction of the viewing angle were symmetric, as described in Embodiments 1, 2 and 3.

(Embodiment 5)

In order to confirm an alignment property of the homeotropic alignment liquid crystal film according to an varying amount of the surfactant included in the polymerizable and reactive liquid crystalline mixture solution including the surfactant, in Embodiment 5 were prepared polymerizable and reactive liquid crystalline mixture solutions including the surfactant in which a fluor-based surfactant FC4430 was added at an amount of 0.4, 1.2 and 2.0% by weight, respectively, based on 100% by weight of the solid included in the reactive liquid crystalline mixture solution.

For Embodiment 5, the triacetyl cellulose film, alkaline-treated in the same manner as in Embodiment 4, was coated with the reactive liquid crystalline mixture solution in the same manner as in Embodiment 1, and thickness of the cured liquid crystal film was 1 μm.

In order to confirm an alignment state of the liquid crystal layer, only the liquid crystal film was peeled off using the glass substrate coated with a pressure sensitive adhesive, positioned between vertically crossed polarizing plates, and then an alignment state of the liquid crystal film was observed. As a result, when the liquid crystal films including FC4430 at the amount of 0.4, 1.2 and 2.0% by weight were observed between the vertically crossed polarizing plates, the light was leaked in the vertical direction of the film, and the phase difference (Rth) value in the vertical direction were 108, 113 and 103 nm, respectively. The result is listed in the following Table 2.

TABLE 2

| | FC4430 Content (% by weight) | | |
|---|---|---|---|
| | 0.4 | 1.2 | 2.0 |
| Alignment or Not | Alignment | Alignment | Alignment |
| $R_{th}$ (nm) | 108 | 113 | 103 |

(Embodiment 6)

2.0% by weight of the silicone-based surfactant BYK-300 (trade name, manufactured from the company BYK-Chemie) was added instead of the fluor-based surfactant FC4430 in the polymerizable and reactive liquid crystalline mixture solution including the surfactant used in Embodiment 1, based on 100% by weight of the solid included in the reactive liquid crystalline mixture solution. A liquid crystal film having a thickness of 1.0 μm was prepared in the same manner as in Embodiment 1, except that the aforementioned solution was used.

Figure 9:
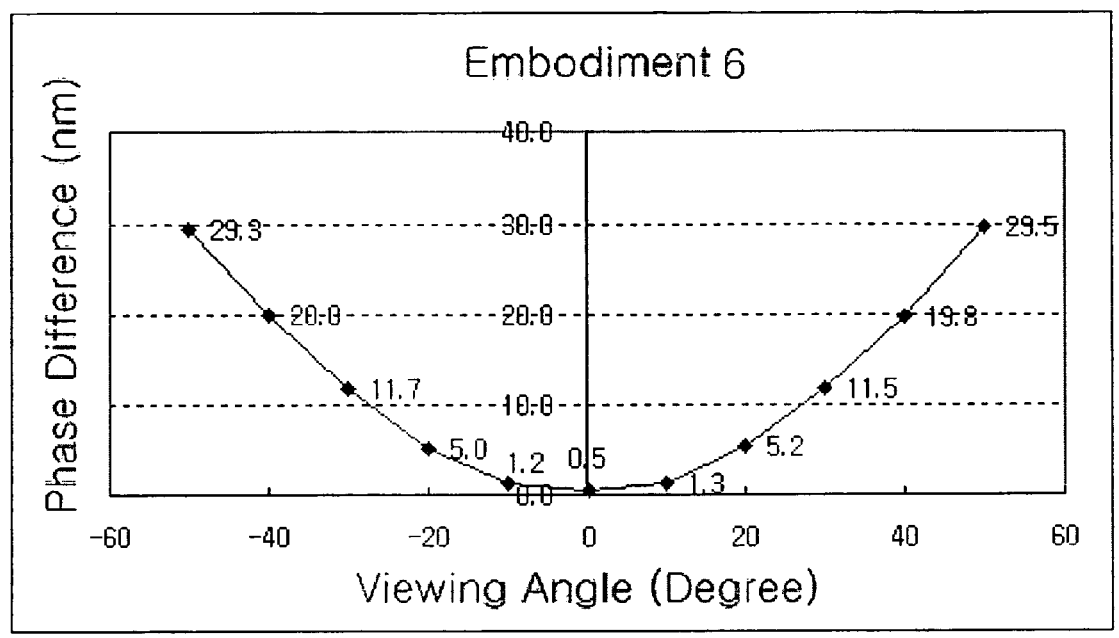
FIG. 9 is a diagram showing a change curve of phase difference values according to viewing angles of a homeotropic alignment liquid crystal film prepared in Embodiment 6.

For Embodiment 6, the phase difference of the liquid crystal film was measured in the same manner as in Embodiment 1, the phase difference values according to the viewing angles were shown in FIG. 9, and the phase difference (Rth) value in the vertical direction was 105 nm in Embodiment 6.

(Comparative Embodiment 1)

A solid, in which 30% by weight of HEA (Hydroxyethyl acrylate), 30% by weight of HDDA (Hexanediol diacrylate), 35% by weight of PETA (Pentaerythritol Triacrylate) and 5.0% by weight of Irgacure 907 (manufactured from the company Ciba-Geigy, Switzerland) were mixed, was dissolved in a mixed solvent including 70% by weight of IPA (Isopropyl alcohol) and 30% by weight of toluene so that content of the solid can be 10% by weight, and then a fluorocarbon-based surfactant Novec (trade name, manufactured from the company 3M, U.S.A.) FC4430 was added so that its content can be 2.0% by weight, based on 100% by weight of the solid included in the entire solution, to prepare an alignment layer solution.

A alignment film was coated with the alignment layer solution using a wire-bar coater (No. 5), kept at 50° C. in a drying oven for 2 minutes, and then cured once at a rate of 3 m/min using a 80 W/cm high-pressure mercury lamp. The resultant alignment layer was clear and its thickness was 0.7 μm.

A liquid crystal film having a thickness of 1.0 μm was prepared by the same coating and photocuring processes on the alignment layer as in Embodiment 1 using the polymerizable and reactive liquid crystalline mixture solution in which only the surfactant FC4430 was removed from the polymerizable and reactive liquid crystalline mixture solution including the surfactant identical to that of Embodiment 1, and the phase difference of the liquid crystal film was measured in the same manner as in Embodiment 1.

Figure 10:
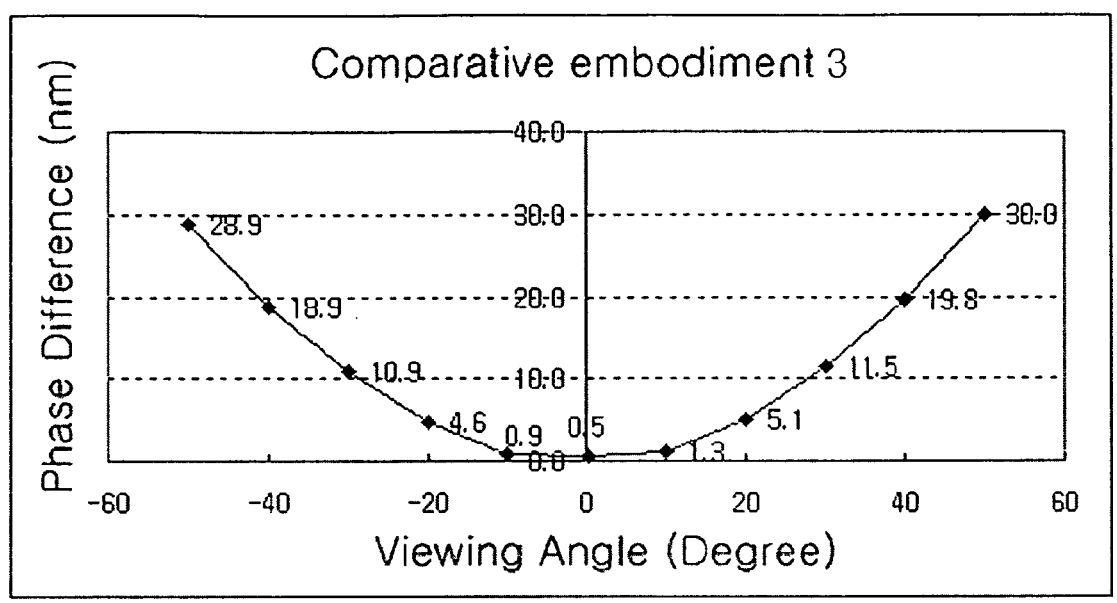
FIG. 10 is a diagram showing a change curve of phase difference values according to viewing angles of a homeotropic alignment liquid crystal film prepared in Comparative embodiment 3.

The phase difference values according to the viewing angles of Comparative embodiment 1 were shown in FIG. 10, and the phase difference (Rth) value in the vertical direction was 103 nm.

From Comparative embodiment 1, it was seen that the liquid crystal molecules of the liquid crystal film were also aligned vertically to the film surface since the phase difference increased as the viewing angle increased, the values in a − direction and a + direction of the viewing angle were symmetric, as described in Embodiments 1 to 6. It was also revealed that there was no difference of a level of its alignment because the phase difference (Rth) value in the vertical direction was not significantly different to those of Embodiments 1 to 6.

(Comparative Embodiment 2)

A liquid crystal film having a thickness of 1.0 μm was prepared by the same coating and photocuring processes on the same substrate coated as in Embodiment 1 using the polymerizable liquid crystalline mixture solution in which only the surfactant was removed from the polymerizable and reactive liquid crystalline mixture solution including the surfactant used in Embodiment 1.

In order to confirm an alignment state of the liquid crystal layer, only the liquid crystal film was peeled off using the glass substrate coated with a pressure sensitive adhesive.

However, the light was heavily leaked when the liquid crystal film was put between the vertically crossed polarizing plates and observed by the naked eyes in the vertical direction of the film, indicating that the liquid crystal molecule was not homeotropically aligned to a surface of the film.

(Comparative Embodiment 3)

A solid, in which 30% by weight of HEA (Hydroxyethyl acrylate), 30% by weight of HDDA (Hexanediol diacrylate), 35% by weight of PETA (Pentaerythritol Triacrylate) and 5.0% by weight of Irgacure 907 (manufactured from the company Ciba-Geigy, Switzerland) were mixed, was dissolved in a mixed solvent including 70% by weight of IPA (Isopropyl alcohol) and 30% by weight of toluene so that content of the solid can be 10% by weight, and then a fluorocarbon-based surfactant Novec (trade name, manufactured from the company 3M, U.S.A.) FC4430 was added so that its content can be 2.0% by weight, based on 100% by weight of the solid included in the entire solution, to prepare an alignment layer solution.

A alignment film was coated with the alignment layer solution using a wire-bar coater (No. 5), kept at 50° C. in a drying oven for 2 minutes, and then cured once at a rate of 3 m/min using a 80 W/cm high-pressure mercury lamp. The resultant alignment layer was clear and its thickness was 0.7 μm.

A liquid crystal film having a thickness of 1.0 μm was prepared by the same coating and photocuring processes on the alignment layer as in Embodiment 1 using the polymerizable and reactive liquid crystalline mixture solution in which only the surfactant FC4430 was removed from the polymerizable and reactive liquid crystalline mixture solution including the surfactant identical to that of Embodiment 1, and the phase difference of the liquid crystal film was measured in the same manner as in Embodiment 1.

The phase difference values according to the viewing angles of Comparative embodiment 3 were shown in FIG. 10, and the phase difference (Rth) value in the vertical direction was 103 nm.

From Comparative embodiment 3, it was seen that the liquid crystal molecules of the liquid crystal film were also aligned vertically to the film surface since the phase difference increased as the viewing angle increased, the values in a − direction and a + direction of the viewing angle were symmetric, as described in Embodiments 1 to 6. It was also revealed that there was no difference of a level of its alignment because the phase difference (Rth) value in the vertical direction was not significantly different to those of Embodiments 1 to 6.

INDUSTRIAL ABILITY

According to the present invention, the homeotropic alignment liquid crystal film having a homeotropic alignment property without forming an additional alignment layer on a plastic substrate undergoing the hydrophilic treatment may be obtained, and therefore the homeotropic alignment liquid crystal film of the present invention has the excellent effects of reduction of the manufacturing cost due to the simplicity of the process, and therefore shortening of the processing time and reduction of the poor products since the step of forming an additional alignment layer may be omitted.

And, the homeotropic alignment liquid crystal film of the present invention has an excellent effect that is may be mass-produced by applying a roll to roll process required for the mass production since an additional plastic substrate undergoing the hydrophilic treatment, the protective film of the polarizing plate, or other retardation films included in the polarizer film may be used as a substrate to prepare a homeotropic alignment liquid crystal film.

Also, the polarizer film including the homeotropic alignment liquid crystal film and the homeotropic alignment liquid crystal film prepared according to the present invention has an advantageous effect capable of being very useful as a major component of the viewing-angle compensation film and the retardation film, etc. in various LCD modes.

What is claimed is:

1. A method for preparing a homeotropic alignment liquid crystal film without an alignment layer, comprising
   a step of hydrophilically treating a cellulose derivative film having an acetate group by dipping into an aqueous NaOH solution to hydrolyze the acetate group to an alcohol group, and a step of directly coating a polymerizable and reactive liquid crystalline mixture solution consisting of a surfactant including a hydrophobic chain, reactive liquid crystal monomers, photoinitiators and solvents on the cellulose derivative film as a plastic substrate, so that the hydrophobic chain orients in a direction normal to the plastic substrate to cause the liquid crystal monomers to orient in a homeotropic direction, and drying and then UV irradiating the mixture solution to fix the homeotropic alignment liquid crystal film with a phase difference value in the vertical direction (Rth) of 99 to 113 nm and a thickness of 0.1 to 10 μm, wherein the surfactant is used in an amount of 0.4 to 2.0% by weight, based on the total mass of the solid included in the total solution, wherein the surfactant is selected from the group consisting of fluorocarbon-based and silicon-based surfactant, and wherein the reactive liquid crystal monomers comprise three compounds having the following Formulas 1 to 3 respectively,

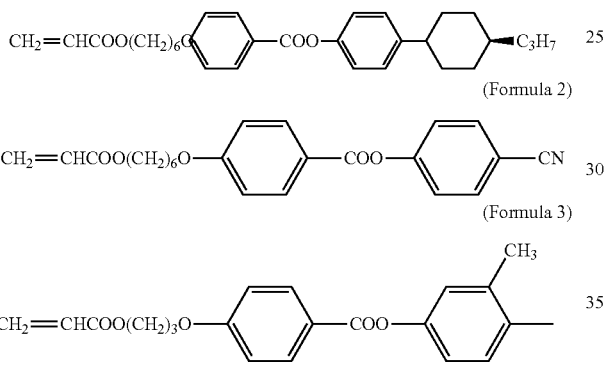

wherein the reactive liquid crystal monomers are prepared from solids dissolved in the solvents, the solids composed of 40% by weight of the compound of Formula 1, 27% by weight of the compound of Formula 2, 27% by weight of the compound of Formula 3, and 6.0% by weight of the photoinitiator.

2. The method for preparing a homeotropic alignment liquid crystal film according to claim 1, wherein a protective film or a retardation film of a polarizing plate is used for the plastic substrate.

3. The method for preparing a homeotropic alignment liquid crystal film according to claim 1, further comprising the step of dissolving solids in the solvents to prepare the reactive liquid crystalline mixture solution.

4. A method for preparing a homeotropic alignment liquid crystal film without an alignment layer, comprising a step of hydrophilically treating a cellulose derivative film having an acetate group by a corona discharge treatment, a step of directly coating a polymerizable and reactive liquid crystalline mixture solution consisting of a surfactant including a hydrophobic chain, reactive liquid crystal monomers, photoinitiators and solvents on the cellulose derivative film as a plastic substrate, so that the hydrophobic chain orients in a direction normal to the plastic substrate to cause the liquid crystal monomers to orient in a homeotropic direction, and drying and then UV irradiating the mixture solution to fix the homeotropic alignment liquid crystal film with a phase difference value in the vertical direction (Rth) of 99 to 113 nm and a thickness of 0.1 to 10 μm, wherein the surfactant is used in an amount of 0.4 to 2.0% by weight, based on the total mass of the solid included in the total solution, wherein the surfactant is selected from the group consisting of fluorocarbon-based and silicon-based surfactant, and wherein the reactive liquid crystal monomers comprise three compounds having the following Formulas 1 to 3 respectively,

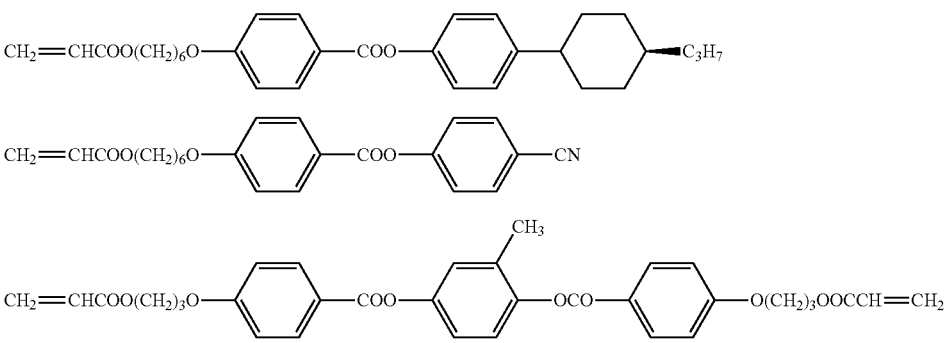

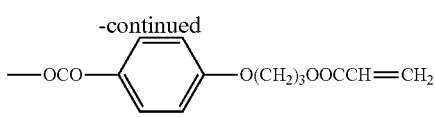

wherein the reactive liquid crystal monomers are prepared from solids dissolved in the solvents, the solids composed of 40% by weight of the compound of Formula 1, 27% by weight of the compound of Formula 2, 27% by weight of the compound of Formula 3, and 6.0% by weight of the photoinitiator.

5. The method for preparing a homeotropic alignment liquid crystal film according to claim 4, wherein a protective film or a retardation film of a polarizing plate is used for the plastic substrate.

6. The method for preparing a homeotropic alignment liquid crystal film according to claim 4, further comprising the step of dissolving solids in the solvents to prepare the reactive liquid crystalline mixture solution.

* * * * *